United States Patent [19]
Bohnke

[11] Patent Number: 5,992,483
[45] Date of Patent: Nov. 30, 1999

[54] BACKHOE GRINDER

[76] Inventor: Dean Bohnke, 16309 Hoagland Rd., Monroeville, Ind. 46773

[21] Appl. No.: 09/175,986

[22] Filed: Oct. 20, 1998

Related U.S. Application Data

[63] Continuation-in-part of application No. 08/780,504, Jan. 8, 1997, Pat. No. 5,823,238.

[51] Int. Cl.[6] .................................................. A01G 23/06
[52] U.S. Cl. ......................... 144/24.12; 37/302; 144/334; 241/101.74
[58] Field of Search ....................... 37/301, 302; 144/4.1, 144/24.12, 34.1, 334; 241/101.71, 101.74, 101.76

[56] References Cited

U.S. PATENT DOCUMENTS

| 68,463 | 9/1967 | Skillin et al. . | |
|---|---|---|---|
| 3,198,224 | 8/1965 | Hiley . | |
| 3,336,958 | 8/1967 | Carlton | 144/24.12 |
| 3,545,509 | 12/1970 | Baxter . | |
| 3,685,557 | 8/1972 | Groce | 144/24.12 |
| 3,937,261 | 2/1976 | Blum | 144/24.12 |
| 4,041,996 | 8/1977 | Grover | 144/24.12 |
| 4,074,447 | 2/1978 | Shriver, Jr. et al. | 144/24.12 |
| 4,180,107 | 12/1979 | Grover . | |
| 4,557,421 | 12/1985 | Probst et al. . | |
| 5,158,126 | 10/1992 | Lang . | |
| 5,355,918 | 10/1994 | Lang . | |
| 5,499,771 | 3/1996 | Esposito et al. | 144/24.12 |
| 5,501,257 | 3/1996 | Hickman . | |
| 5,513,811 | 5/1996 | Hung . | |
| 5,553,993 | 9/1996 | Gilbert . | |

*Primary Examiner*—W. Donald Bray
*Attorney, Agent, or Firm*—Randall J. Knuth

[57] ABSTRACT

A tree grinder movable from tree to tree. The tree grinder includes a frame movable from tree to tree, a drum and a drum support rotatably mounting the drum to the frame. The drum support rotates or swivels relative to the frame via a swivel motor. A hydraulic motor is attached to the drum support with a first drive pulley attached to the hydraulic motor and a second drive pulley connected to the drum. A plurality of drive belts connects said first drive pulley to said second drive pulley so the hydraulic motor may rotate the drum.

10 Claims, 3 Drawing Sheets

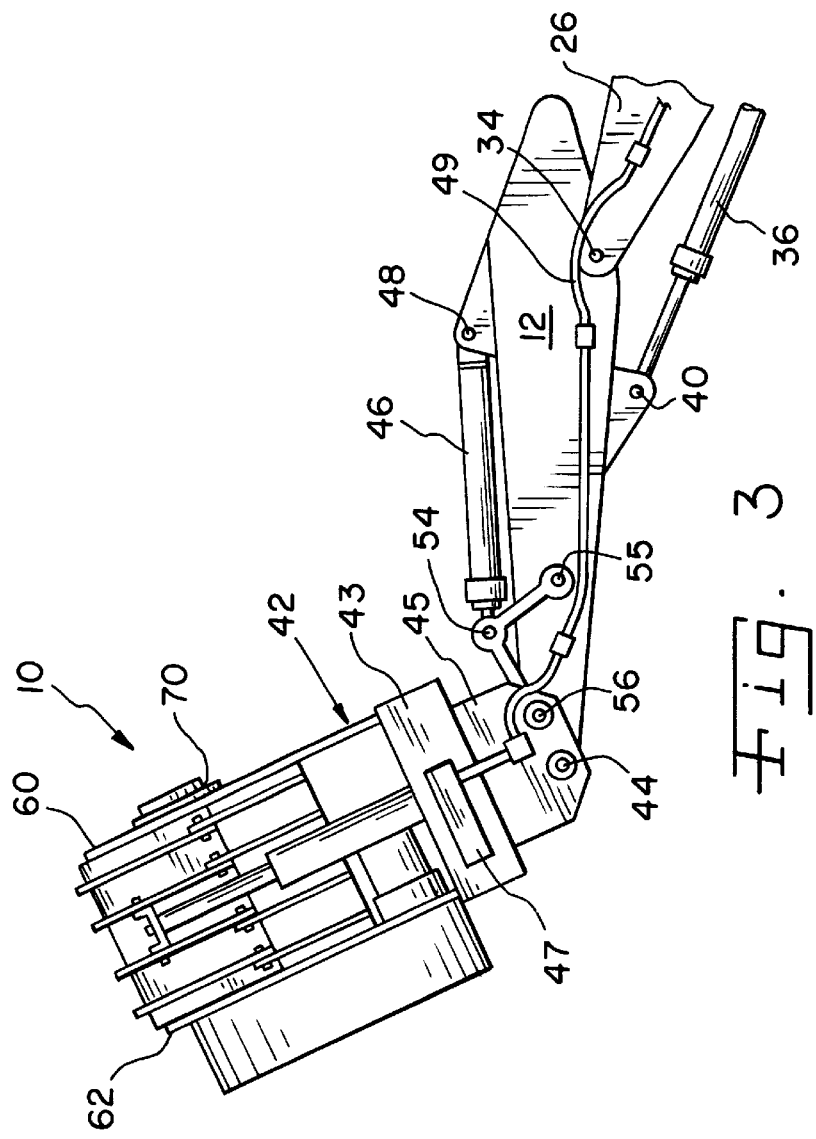
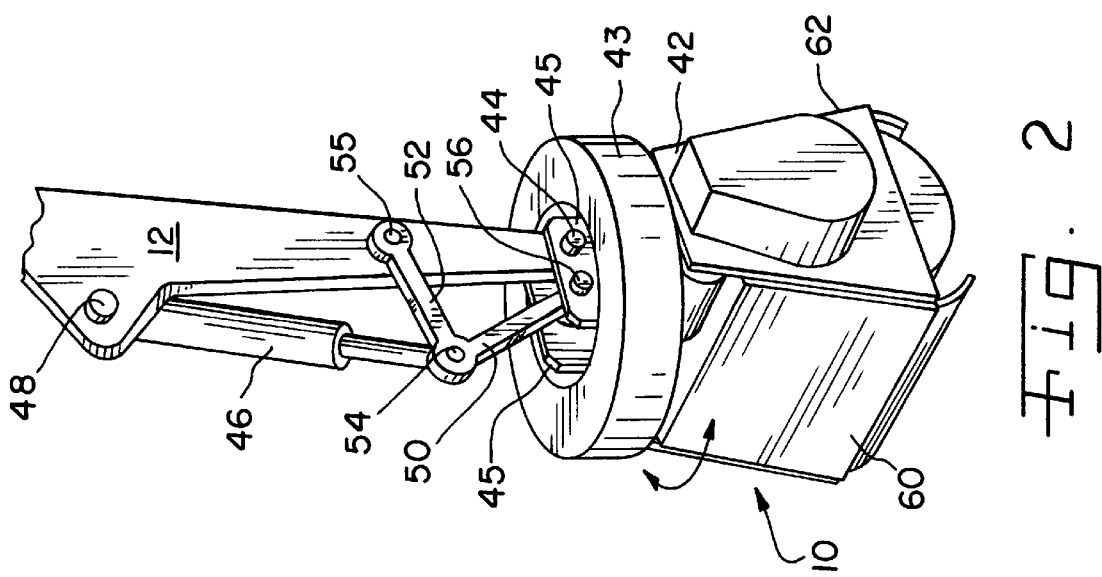

BACKHOE GRINDER

This application is a continuation-in-part of U.S. application Ser. No. 08/780,504 filed on Jan. 8, 1997, now U.S. Pat. No. 5,823,238.

BACKGROUND OF THE INVENTION

1. Field of the Invention

The present invention relates to a machine for clearing land, and more particularly to an environment friendly attachment mounted on an excavator which grinds trees, shrubs, concrete, tree stumps and roots, and to a method of grinding standing large trees.

2. Description of the Related Art

In the past, land has been cleared for many purposes by removing tree stumps and tree roots. Large tractors have been used to remove tree stumps and roots from the ground. After removal from the ground, tree stumps and roots have been piled for burning, or they have been hauled away for disposal. Disposal at a remote location has been by burial, or by burning.

Environmental concerns, government requirements and cost have made it necessary to find other methods for clearing land. One method for land clearing is to grind tree stumps and roots into a mulch and leave the mulch in the ground where the tree stumps and roots were originally. This procedure eliminates transportation costs and disposal costs. Leaving such shredded wood and fiber mulch on the ground improves soil fertility.

Tree stump grinders have been used to grind tree stumps following the removal of a tree from areas near buildings or other areas where it is desirable to minimize disturbance of the surface.

Known stump machines generally comminute the portion of a stump that is above the ground and the portions which are near the surface. These stump grinding machines though do not operate on standing trees, only on stumps on which the majority of the standing tree portion has been previously removed. They grind up sufficient material to allow soil to cover the remaining stump and for grass to be planted. Such stump grinders generally do not remove all of a stump or tree roots. Stump grinders designed to grind the portion of a stump that is close to the surface are relatively slow. Additionally, such grinding machines have been oriented for horizontal rotation, not vertical rotation.

SUMMARY OF THE INVENTION

The invention includes a frame movable from tree to tree, a drum and a drum support rotatably mounting the drum to the frame. The drum support rotates or swivels 360 degrees relative to the frame via a swivel motor. A hydraulic motor is attached to the drum support with a first drive pulley attached to the motor and a second drive pulley connected to the drum. A plurality of drive belts connects the first drive pulley to the second drive pulley so the hydraulic motor may rotate the drum.

The invention comprises, in one form thereof, a grinder for grinding items, such as trees, having a frame movable from location to location tree, a drum, and a drum support rotatably mounting the drum to the frame. The drum support is swivelably mounted to the frame. A drum motor is attached to the drum support while a first drive pulley is attached to the drum motor and a second drive pulley is connected to the drum. A plurality of drive belts drivingly connect the first drive pulley to the second drive pulley. In one particular embodiment, the drum support is swivelable 360 degrees.

An advantage of the present invention is that it is adaptable for grinding and shredding standing trees. The vertical orientation of the rotating drum permits the grinder to control the placement and ejection of shredded material. Further, the vertical orientation of the rotating drum and anchor assembly permit more options on grinding of trees independent of the workplace angle or grade. The system is able to collapse a tree and grind it while preventing the tree from falling on the operator.

A further advantage of the present invention is that the entire grinding system is balanced both statically and dynamically. By the use of V-belts as a drive member, in case of wear or need of replacement, no rebalancing of the system is necessary.

Yet another advantage of the present invention is that it may utilize a number of different type cutting or grinding bits depending on the material to be ground. Diamond tipped bits, flail bits attached by a pivoting connection, knife edge bits, and others may be utilized by attachment to the rotatable drum.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 2 is a side elevational view of the grinder;

FIG. 3, is a front elevational view of the grinder and backhoe stick;

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
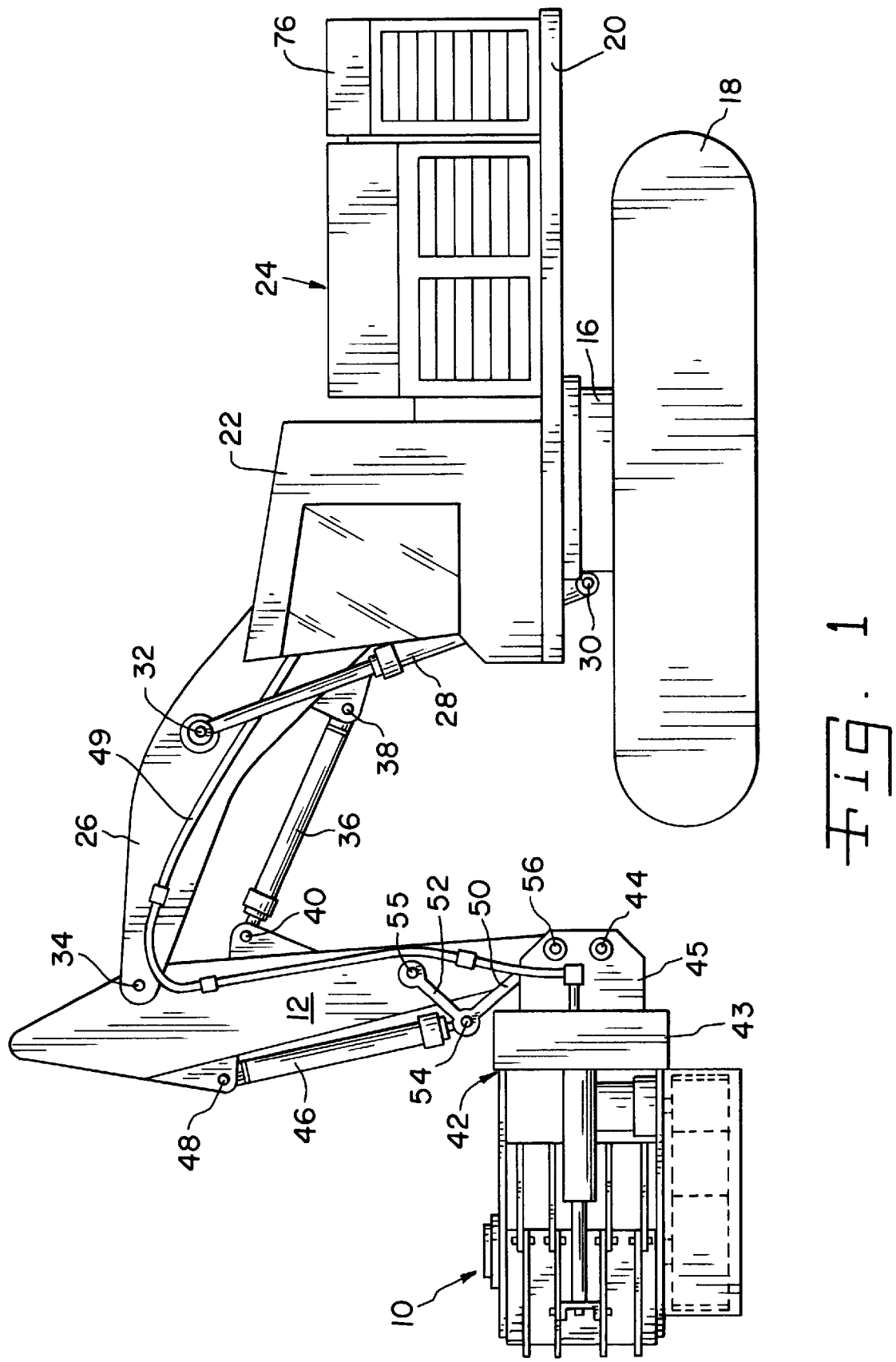
FIG. 1 is an elevational view of the grinder and backhoe of the present invention with the drum shown in a vertical orientation.

The tree stump grinder 10 is mounted on the stick 12 of an excavator or backhoe 14. The excavator 14, a portion of which is shown in FIG. 1, includes a base frame 16. The base frame 16 is supported by a pair of track assemblies 18. A swing frame 20 is connected to the base from 16 by a trunnion which allows the swing frame 20 to pivot about a generally vertical axis relative to the base frame 16. An operator's cab 22 is mounted on one side of the swing frame 20. An engine compartment 24 is also mounted on the swing frame 20. The engine compartment 24 houses an internal combustion engine. The internal combustion engine drives hydraulic oil pumps which drive the tracks and provide power to perform all the other standard excavator functions. Valves for directing hydraulic oil are controlled from the operator's cab 22.

A typical boom 26 is pivotally attached to the swing frame 20. A pair of hydraulic boom cylinders 28 are connected to the swing frame 20 by pins 30 and to the boom 26 by support pins 32. The operator can direct hydraulic oil to and from the double acting hydraulic boom cylinders 28 to pivot the boom 26 about the axis of its attachment to swing frame 20 to raise and lower the free end of the boom.

A stick 12 is pivotally attached to the free end of the boom 26 by a pivot pin 34. A double acting hydraulic stick cylinder 36 is connected to boom 26 by a pin 38 and to the stick 12 by a pin 40. A valve controlled from the operator's cab can direct oil to and from the hydraulic stick cylinder 46 to pivot the stick 12 relative to the boom 26 about the axis of the pivot pin 34.

Referring to FIG. 2, the tree stump grinder 10 of the present invention includes a drum support such as a yoke assembly 42. Yoke assembly 42 is swivelably attached to hydraulic swivel 43. Hydraulic swivel 43 permits yoke assembly 42 to swivel 360 degrees about the axis of the stick 12. Mounting plates 45 are affixed to hydraulic swivel 43. Mounting plates 45 are pivotally attached to stick 12 by pivot pin 44. A double acting hydraulic grinder swing cylinder 46 is attached to stick 12 by a pin 48. The hydraulic grinder swing cylinder 46 is also attached to a pair of links 50 and links 52 by a pin 54. The links 50 are attached to stick 12 by pin 55. The links 52 are attached to mounting plates 45 by a pin 56. Oil can be directed by a valve, controlled from the operator's cab, to and from the hydraulic grind swing cylinder 46 to pivot the yoke assembly 42 about the axis of the pivot pin 44. The links 50 and 52 increase the range of movement of the yoke assembly 42 about the axis of the pivot pin 44 and increase the force available to pivot the yoke assembly 42 in some portions of the yoke's range of movement. The hydraulic grinder swing cylinder 46, the links 50, and the links 52 are standard parts of a excavator 44 that normally control a bucket attached to the stick 12 during use of the support vehicle as an excavator.

Referring to FIG. 3, hydraulic swivel 43 houses swivel motor 47. Swivel motor 47 is a hydraulic motor with hydraulic oil supplied to it through oil supply line 49. During operation, swivel motor 47 powers the 360 degree swivel action of yoke assembly 42. Alternatively, an electric motor may be used in place of a hydraulic motor to actuate swivel action of yoke assembly 42. An operator can control the swivel action of yoke assembly 42 by directing the flow of hydraulic oil 47 through oil supply 49.

During the operation of the present invention, hydraulic swivel 43 is stationary relative to swiveling yoke assembly 42. Alternatively, hydraulic swivel 43 may swivel along with yoke assembly 42 about the axis of stick 12.

Figure 4:
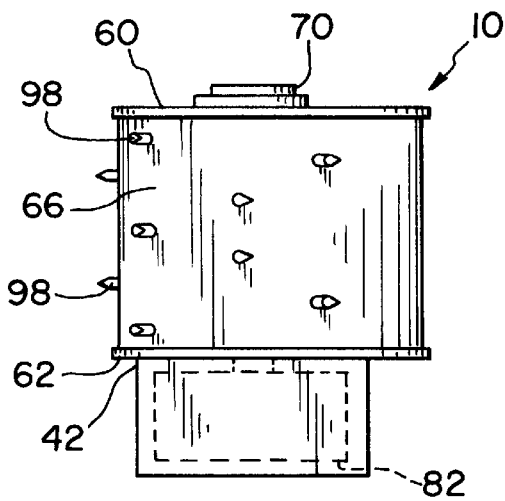
FIG. 4 is a front elevational view of the grinder module of the present invention.
Figure 5:
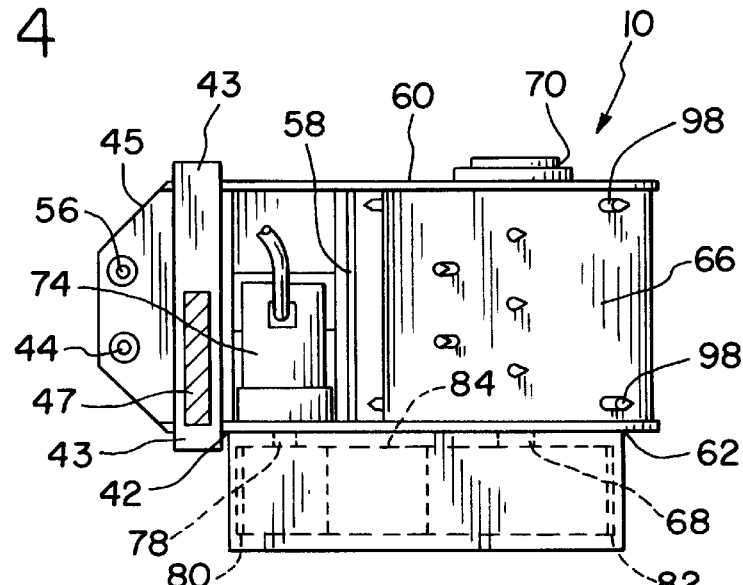
FIG. 5 is a side elevational view of the grinder of the present invention.
Figure 6:
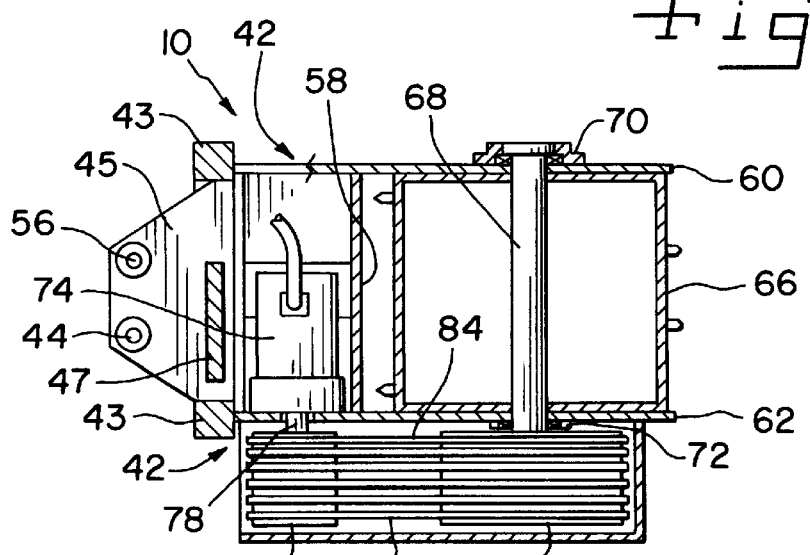
FIG. 6 is a side sectional view of the grinder of the present invention showing the plurality of drive belts.

The drum support, i.e., yoke assembly 42, as shown in FIGS. 4–6, has a main portion 58 and a pair of arms 60 and 62. Hydraulic swivel 43 is swivelly attached to the main portion 58 of the yoke assembly 42. A pair of mounting plates 45 are rigidly secured to hydraulic swivel 43. The mounting plates 45 are used to attach the yoke 42 to the links 50 and stick 12.

A rotatable grinder drum 66 includes a shaft 68 therethrough. The ends of shaft 68 pass through bores in both arms 60 and 62 and connect with bearings 70 and 72 mounted thereon, respectively. The end of shaft 68 extending toward bearing 72, extends therethrough. Drum 66 has an axis for rotation that is oriented vertically during operation. Such vertical orientation permits the safe grinding of entire standing trees and stumps.

A hydraulic drum motor 74 is secured to a portion of yoke assembly 42, preferably to main portion 58. Hydraulic motor 74 is in fluid communication with a source of pressurized hydraulic fluid, such as an auxiliary hydraulic pump operated by a secondary internal combustion engine 76 located within engine compartment 24 or at least on the frame portion of backhoe 14. The hydraulic fluid applied to hydraulic drum motor 74 is controlled by the equipment operator using valves to control the pressure and direction of fluid flow to hydraulic motor 74. By reversing direction of hydraulic fluid, a reversal in the direction of rotation of hydraulic drum motor 74 is accomplished.

Extending from hydraulic drum motor 74 is a shaft 78 on which is attached a first drive pulley 80. On the section of drum shaft 68 that passes through bearing 72 is attached a second drive pulley 82. The preferred type of pulley 80 and 82 is that of a multi V-belt pulley able to mount at least six, but possible more, high strength V-belts 84 thereon. Other types of belts may be utilized. A plurality of V-belts 84 are used to drivingly connect first drive pulley 80 with second drive pulley 82. Use of these belts 84 reduces shock loading of hydraulic drum motor 74 during use, thereby increasing its operational life. If desired, additional gearing of hydraulic drum motor 74 may be utilized.

A plurality of grinding, cutting or shredding bit assemblies 86 are secured to the outside surface of the grinder drum 66. Such bit assemblies may include carbide tipped bits, flail type bits and hammer bits attached for pivotable connection to the grinder drum 66.

The flow of hydraulic oil to and from the hydraulic motor 74 can be stopped to prevent the grinder drum 66 from rotating.

The hydraulic boom cylinders 28, the hydraulic stick cylinder 36, and the hydraulic grinder swing cylinder 46, are all connected to the hydraulic system that is standard on the excavator 14. No modifications are required in the hydraulic system to control these cylinders.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A tree grinder comprising:

frame movable from tree to tree;

a drum;

a drum support rotatably mounting said drum to said frame, said drum support swivelably mounted to said frame;

a drum motor attached to said drum support;

a first drive pulley attached to said drum motor;

a second drive pulley connected to said drum; and a plurality of drive belts connecting said first drive pulley to said second drive pulley.

2. The tree grinder of claim 1 in which said drum motor is a hydraulic motor.

3. The tree grinder of claim 1 further comprising an auxiliary hydraulic power unit to drive said drum motor.

4. The tree grinder of claim 1 further comprising a plurality of grinding tools attached to said drum.

5. The tree grinder of claim 1 in which said drum has an axis for rotation that is oriented vertically during operation.

6. The tree grinder of claim 1 wherein said drum support is swivelable 360 degrees.

7. The tree grinder of claim 1 wherein said drum support is pivotably mounted to said frame.

8. The tree grinder of claim 1, further comprising:
a swivel motor for swiveling said drum support drum.

9. The tree grinder of claim 8 wherein said swivel motor is an electric motor.

10. The tree grinder of claim 8 wherein said swivel motor is a hydraulic motor.

* * * * *